United States Patent
Duursma et al.

[11] Patent Number: 6,129,491
[45] Date of Patent: Oct. 10, 2000

[54] INFLATABLE DEVICE WITH PRESSURE LIMITING VALVE

[75] Inventors: Anne Max Duursma, Rijksweg 71, Delfzijl, Netherlands, 9934 PC; Johannes Antonius Weide, Doetinchem, Netherlands

[73] Assignee: Anne Max Duursma, Delfzije, Netherlands

[21] Appl. No.: 09/242,297

[22] PCT Filed: Aug. 16, 1996

[86] PCT No.: PCT/NL96/00326

§ 371 Date: Apr. 16, 1999

§ 102(e) Date: Apr. 16, 1999

[87] PCT Pub. No.: WO98/08011

PCT Pub. Date: Feb. 26, 1998

[51] Int. Cl.[7] .................................................. B60P 7/16
[52] U.S. Cl. ............................................. 410/119; 410/125
[58] Field of Search .......................................... 410/119, 118, 410/125, 155; 206/522, 592, 593; 428/35.2; 383/25, 109, 113

[56] References Cited

U.S. PATENT DOCUMENTS

| | | |
|---|---|---|
| 1,618,676 | 2/1927 | Reach et al. . |
| 2,024,780 | 12/1935 | Buckman . |
| 3,462,027 | 8/1969 | Puckhaber . |
| 3,808,981 | 5/1974 | Shaw ........................ 410/119 |
| 3,868,026 | 2/1975 | Bag . |
| 4,073,389 | 2/1978 | Angarola et al. ........... 410/119 |
| 5,288,188 | 2/1994 | Vance ......................... 410/119 |
| 5,730,564 | 3/1998 | Howlett, Jr. ............... 410/119 |
| 5,868,534 | 2/1999 | Goshorn et al. ........... 410/119 |

FOREIGN PATENT DOCUMENTS

| | | |
|---|---|---|
| 956513 | 10/1974 | Canada .................... 410/119 |
| 0 324 519 A2 | 7/1989 | European Pat. Off. . |
| 0 553 027 A1 | 7/1993 | European Pat. Off. . |
| 2 291 114 | 6/1976 | France . |
| 93 06 061 | 8/1993 | Germany . |
| 125756 | 4/1919 | United Kingdom ............ 383/25 |
| WO 95/01923 | 1/1995 | WIPO . |

*Primary Examiner*—Stephen T. Gordon
*Attorney, Agent, or Firm*—Burns, Doane, Swecker & Mathis, L.L.P.

[57] ABSTRACT

An inflatable dunnage bag for cushioning cargo during transport includes an automatic inflation shut-off feature. During inflation of the device, once a pressure in a predetermined range is achieved, an intake valve structure is compressed in an interspace between the bag cover and an inflated bladder such that the intake squeezed shut to limit additional air input.

6 Claims, 3 Drawing Sheets

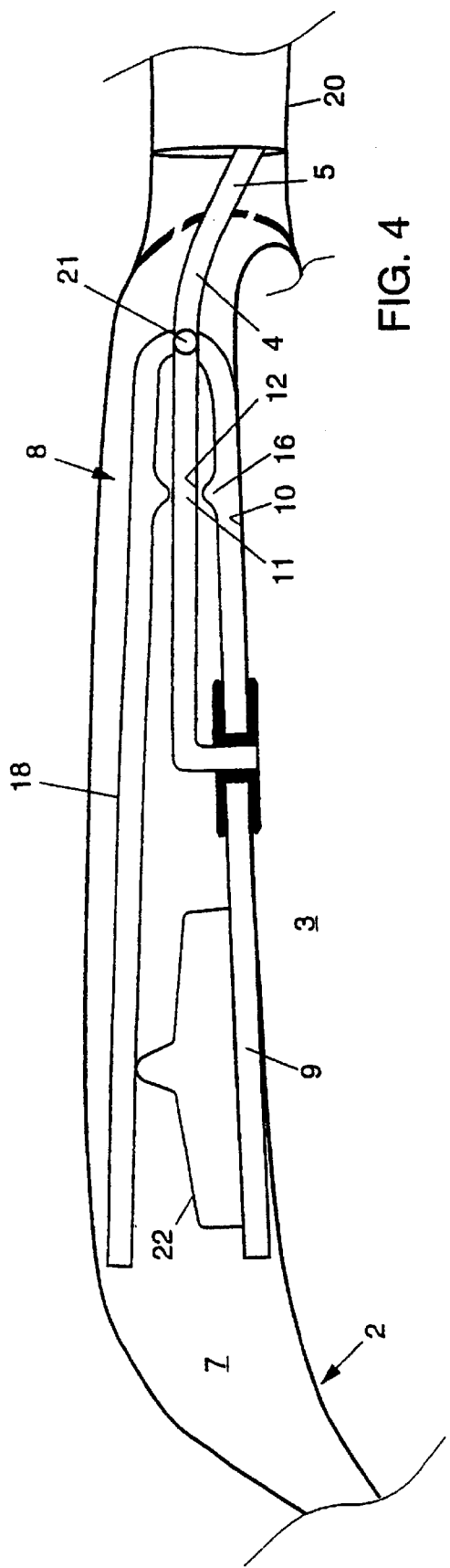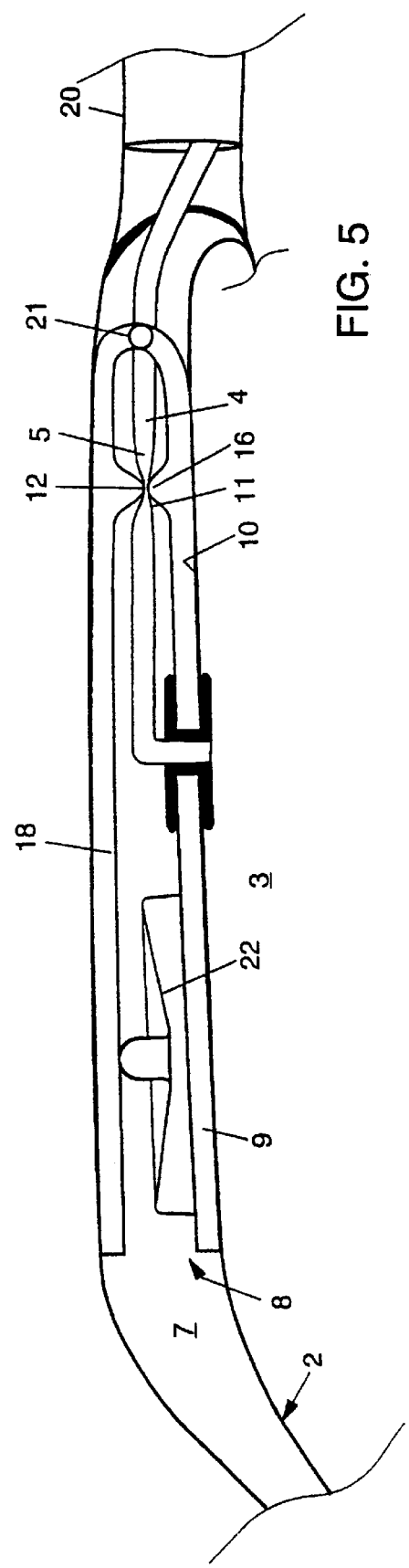

_US 6,129,491_

INFLATABLE DEVICE WITH PRESSURE LIMITING VALVE

TECHNICAL FIELD

The invention relates to an inflatable device which is are to be inflated to a predetermined pressure. A particular example of such a device is a dunnage bag for filling or bridging free interspaces during transport of pieces of cargo to prevent shifting and abrasion of the cargo. Other examples of such inflatable devices are balloons, inflatable water crafts, and devices for positioning injured limbs.

BACKGROUND ART

An example of a dunnage bag is described in U.S. Pat. No. 3,462,027. Generally, the prescribed practice for inflating dunnage bags and many other inflatable devices is to use a pressure gauge to check whether the required pressure has been achieved. This, however, is cumbersome procedure. Therefore a usual practice for checking the pressure in many inflatable devices is to simply press on the device and to feel how resilient it is. Obviously, this is a very unreliable method of checking the pressure of an inflated device. This is particularly true if the pressure difference with the surrounding atmosphere is in excess of 0.5 to 1.0 bar.

Dunnage bags for example typically have to be inflated to about 0.3 bar. To fill the dunnage bags, usually a compressor is used which provides a maximum pressure of about 8 bar. In practice it has been found that dunnage bags are typically inflated to pressures of up to 4.0 bar. At this pressure, a dunnage bag having a contact surface with cargo or walls of the load space of about 1 $m^2$, which is a usual size of the contact surface, exerts a force of about 40,000 kg to the cargo. Such forces often result in damaging deformation of the cargo or of the container or transport means into which it has been loaded. Another disadvantage of overinflating dunnage bags is that it leads to a substantially increased risk of punctures and explosion. This in turns entails increased costs. Not only exploding dunnage bags, but also leaking or even empty dunnage bags form a safety hazard in that cargo is no longer prevented from shifting, which may be detrimental to the stability of the transport means and cause damage to the transport carrier and the cargo.

Also for many other inflatable devices the correct inflating pressure is critical for making full use of the properties of the device. Underinflation of an inflatable craft for example leads to a reduced stiffness of the hull while overinflation entails the risk of damage to the wall material and the seams. Underinflation of inflatable systems for fixating injured persons leads to a poor fixation while overinflation can hinder blood circulation.

In U.S. Pat. No 2,024,780 an inflatable device which includes a shut-off portion and an operating member connected to the shut-off portion for operating the shut-off portion. The shut-off portion is formed by a valve member axially displaceable in the filling passage between a position lifted from a valve seat allowing the passage of air and a position seated on the valve seat closing off the filling passage. The operating member is formed by a hollow fluid-receiving sack or diaphragm which is secured along its circumference in position within the bladder. Via a valve stem, shut-off portion is connected to a central portion of the sack or diaphragm. As the pressure in the bladder increases during inflation of the bladder, the thickness of the sack or diaphragm reduces and, via the valve stem the shut-off portion is entrained to its closing position by the movement of a central portion of the sack or diaphragm.

SUMMARY OF THE INVENTION

It is an object of the invention to provide a simple, low-cost solution for reliably and automatically obtaining an pressure difference with the surrounding atmosphere in a predetermined range when inflating an inflatable device.

According to the invention, this object is achieved by providing an inflatable device of the above-identified type.

When, during inflation of an inflatable device according to the invention, a pressure in a predetermined range has been achieved, the shut-off structure is compressed in the interspace between the tensioned cover and the inflated bladder. Thus, a force proportional with the pressure difference between the chamber of the bladder and of the surrounding atmosphere is exerted onto the operating member extending by the surface area of the bladder along which the operating member extends while the bladder is in inflated condition. This force is transferred to the shut-off portion and causes the surface area of the shut-off portion to move, against the pressure difference with the surrounding atmosphere in the filling passage, from its retracted position into its forward position at least partially shutting off the filling passage.

For inflating an inflatable device according to the invention, it is sufficient to connect a pressure source to the filling passage and to inflate the device until the flow of air into the device is stopped or substantially restricted by the shut-off structure. The invention does not only prevent overinflation, but can also be used to assure that a predetermined minimum pressure is achieved by inflating a device until the shut-off structure is activated in response to a predetermined pressure in the chamber.

The pressure limiting features according to the present invention do not interfere with any measures taken to assure airtightness of the filling system.

To obstruct the filling passage against a relatively large pressure difference with the surrounding atmosphere in response to a relatively small pressure difference with the surrounding atmosphere in the bladder, various structures for transmitting a first force into a second, larger force can be used, such as a lever structure. However, a particularly simple, wear resistant shut-off structure generating sufficient force to close of the filling passage against the relative large pressure generated by a pressure source is obtained if the surface area of the operating member extending along the bladder is substantially larger than the surface area of the shut-off member which is displaceable between a forward and a retracted positions Other objects, advantages and particular embodiments of the present invention appear from the below description in conjunction with the accompanying drawings and from the dependent claims.

BRIEF DESCRIPTION OF THE DRAWINGS

FIGS. 4 and 5 are more schematic cross-sectional views according to FIGS. 2 and 3 of a bag according to the invention having a different shut-off structure;

MODES FOR CARRYING OUT THE INVENTION

Figure 1:
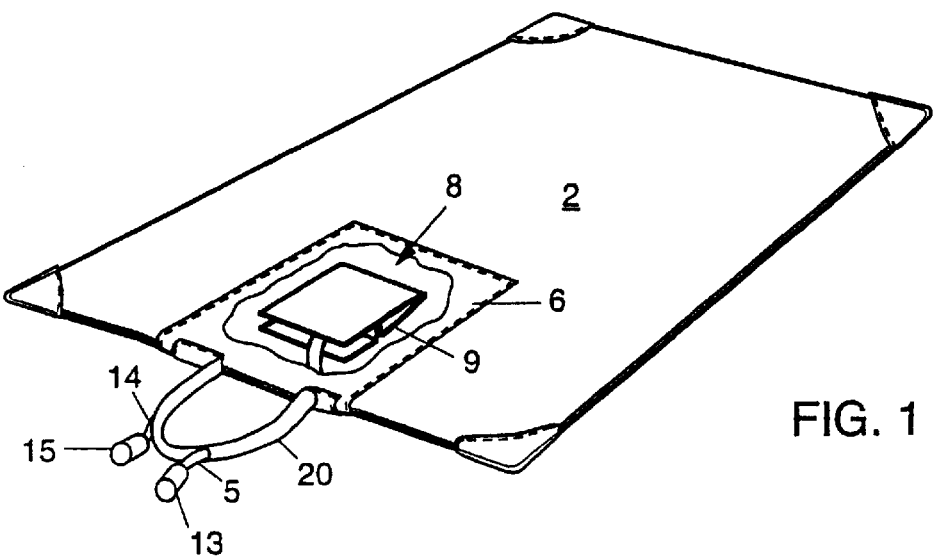
FIG. 1 is a perspective, cut-away view of a dunnage bag according to the present invention.

In the drawings, corresponding part of different embodiments of the device according to the invention are designated by mutually identical reference numerals.

Figure 2:
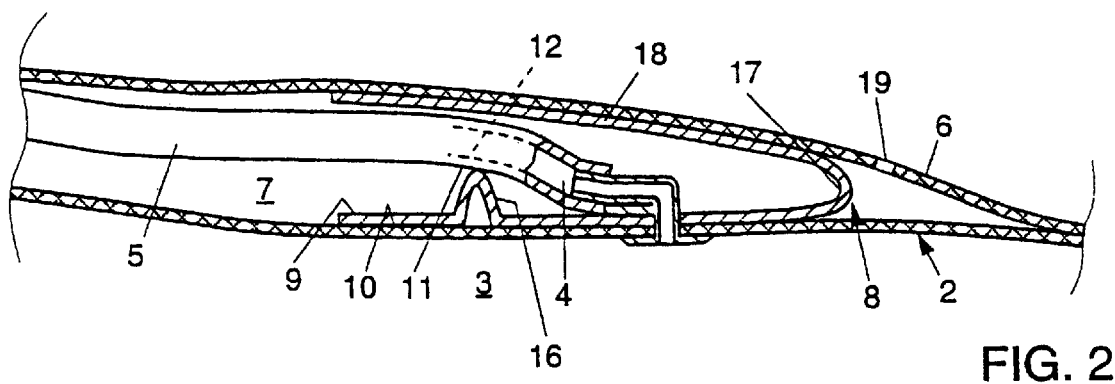
FIGS. 2 and 3 are cross-sectional views of a portion of the bag according to claim 1 including the shut-off structure in different operating conditions.
Figure 3:
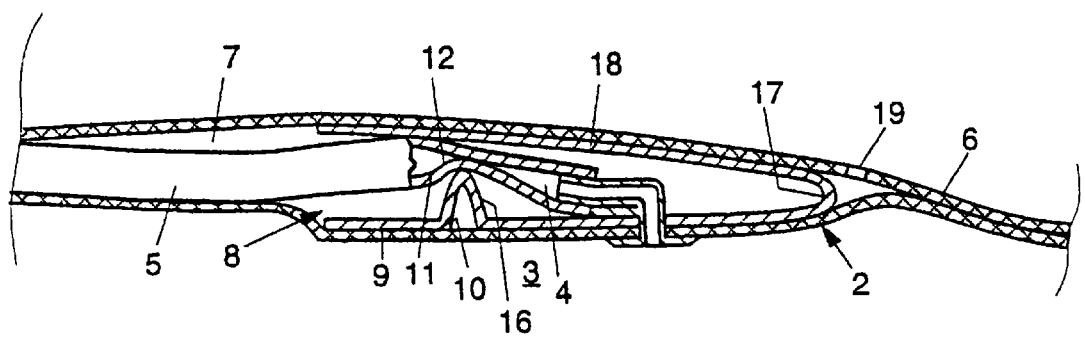

FIGS. 1, 2 and 3 show an example of an inflatable device according to the invention in the form of a dunnage bag 1 for filling up remaining space in a compartment to prevent shifting of cargo in that compartment.

The dunnage bag has a collapsible, essentially airtight bladder 2 bounding a chamber 3 and a passage 4 containing with the chamber 3 for filling that chamber 3. The passage extends through a tube 5 of fibre-reinforced resilient PVC material or other suitable material.

A portion of the bladder 2 is covered by a cover 6. The cover 6 is dimensioned and arranged such that it is tensioned if the bladder 2 is inflated. Between the cover 6 and the bladder 2 an interspace 7 is formed, in which a shut-off structure 8 is arranged.

The shut-off structure 8 has an operating member 9 extending along a first surface area 10 of the bladder 2 and a shut-off portion 11 having a second surface area 12 displaceable between a retracted position clearing the passage 4 (FIG. 2) and a forward position at least partially shutting off the passage 4 (FIG. 3).

The surface area 10 of bladder 2 along which the operating member 9 extends is substantially larger than the surface area 12 of the shut-off portion 11 which is displaceable between positions closing of and clearing the passage 4.

To assure that the dunnage bag remains filled during transport, the filling passage is also provided with a one-way valve 13, which may be provided in the form of a conventional valve of the type used for automobile tyres. To allow quick emptying of the dunnage bag 1, it is further provided with a release tube 14 and a release valve 15.

During inflation of a dunnage as shown in FIGS. 1, 2 and 3, the shut-off structure 9 is initially in a condition as shown in FIG. 2 in which the passage 4 is open and air supplied from a suitable pressure source connected to the valve 13 flows into the chamber 3 via the filling passage 4. As pressure is built up in the chamber 3, the bladder 2 commences to exert 4 pressure on the operating member 9 along its surface portion 10. As the pressure in the chamber 3 increases, the shut-off portion 11 is urged towards its forward position by a projection 16 of the operating member 9 until the ford position of the shut-off portion 11 is achieved and the passage 4 is substantially obstructed. Thus, overfilling of the dunnage bag is automatically prevented. During inflation, the activation of the shut-off structure is easily noticeable by changes in the sound generated by the air flowing into the chamber 3 and by the pressure source encountering a quickly increasing resistance. If the bladder is pumped up using a hand pump or a foot pump, the increased resistance is immediately sensed. It is noted that it is not necessary that the obstruction of the passage 4 is complete when the desired maximum pressure has been achieved. In practice it is sufficient that the passage is obstructed to an extent which is sufficient to signal that the maximum pressure has been achieved and to slow down further filling to such an extent that users are discouraged from trying to inflate the bladder any further.

The pressure at which the shut-off structure can simply be determined by choosing suitable dimensions of the surfaces 10 and 12. For dunnage bags, the shut-off structure can for example be designed to be activated in response to on pressure difference with the surrounding atmosphere of 0.3 bar in the chamber at a maximum filling pressure in the passage of up to 8 bar.

The pressure at which the shut-off structure 8 is activated for obstructing the passage 4 can be dependent on the balance between the pressure in the chamber and a counterforce generated by the filling pressure. To reduce the pressure drop over the shut-off structure during inflation and the dependence of the maximum pressure in the chamber on the maximum filling pressure generated by the available pressure source, the shut-off structure 8 is provided with elastic members in the form of the tube 5 and a flexible connection 17 between the operating member 9 and a support plate 18 opposite the operating member 9 for urging the shut-off portion 11 towards its retracted position. Thus, the counterforce against which the shut-off portion 11 has to urged into its forward position by the pressure exerted by the inflated bladder 2 onto the operating member 9 is mainly dependent on the stiffness of the elastic members 5, 17 and only slightly dependent on the counterforces exerted by the maximum filling pressure.

The operating member is formed by an operating plate 9 and the passage 4 passes between this operating plate 9 and the opposite support plate 18 opposite said operating plate 9. This provides the advantage that a robust construction is obtained in which the passage 4 into the chamber 3 is protected between the plates 9, 18. Furthermore a simple construction is obtained since the two plates 9, 18 can simply be formed by folding a single plate.

The plates 9, 18 are preferably made of resilient plastic material, such as PE, PP or Nylon. It has for example been found that a construction a shown in FIGS. 1–3 is not damaged if wheels of a medium size fork-lift truck are driven over it.

Simplicity of construction is further enhanced since the shut-off portion 11 is formed by a portion of flexible tubing 5 bounding the passage 4, a local projection 16 is provided closely adjacent that tubing 5 and a support 18 is provided opposite that projection 16 such that the wall portion 11 of the tubing 5 is urged in a flattened condition between the projection 16 and the support 18 if the bladder 2 is in inflated condition.

The bladder 2 of the dunnage bag shown in FIGS. 1–3 is made of plastic, preferably reinforced PVC, material. The cover 6 is also made of plastic material, preferably the same material. The cover 6 is welded to the bladder 2 and provided with at least one aeration passage 19. Thus, the bladder 2 and the cover 6 are can be manufactured efficiently from the same material and the aeration hole 19 allows air between the cover 6 and the bladder 2 to escape when the bladder 2 is inflated and the cover 6 is tensioned tight by the bladder 2 pressing against that cover 6. It is noted that the bladder and the cover can also be of different materials. The cover can for example advantageously be formed by a craft paper reinforcement of a thin PE bladder or by a netting or a belt arranged against or around the bladder.

To facilitate simultaneous positioning and filling by one person, the dunnage bag according to FIGS. 1–3 comprising a hand grip 20 and the tube 5 bounding a portion of the passage 4 and extends from the hand grip 20. This facilitates holding the bag and the tube 5 in position with one hand and holding the orifice of a inflating device against the valve free end of the tube 5 with the other hand. It is noted that this feature can also be employed advantageously in a dunnage bag which is not provided with a structure for preventing overinflation.

Figure 6:
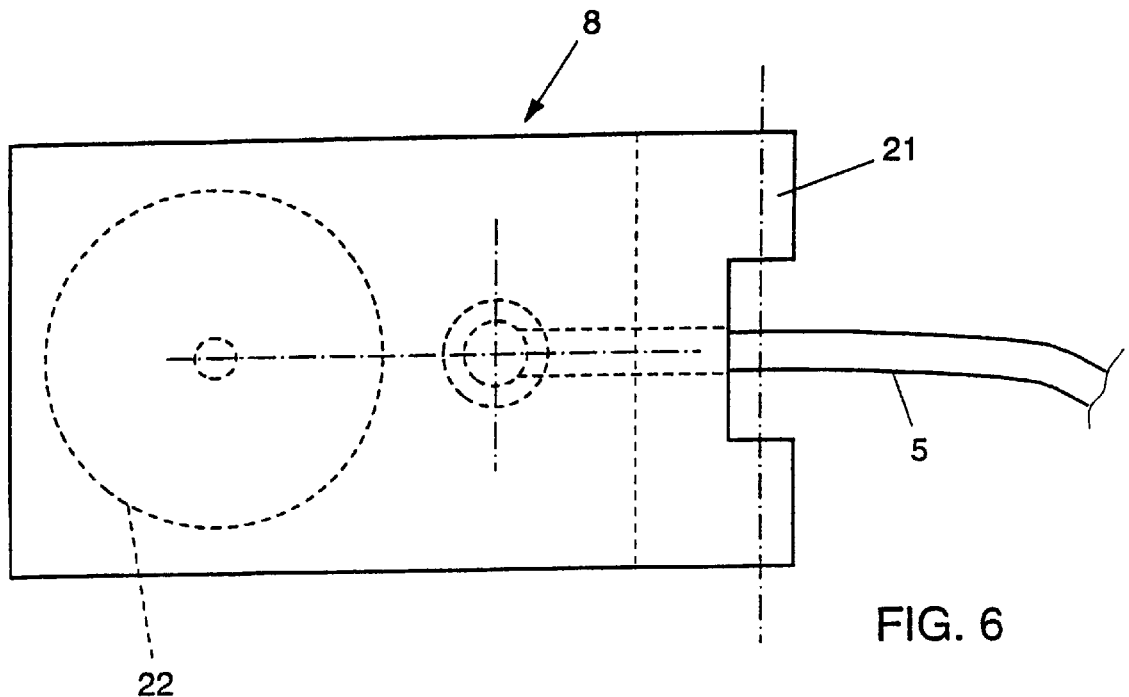
FIG. 6 is a top plan view of a shut-off structure according to FIGS. 4 and 5.

In FIGS. 4–6 relevant portions of a dunnage bag with a shut-off structure 8 according to a presently most preferred embodiment of the present invention are shown.

This shut-off structure 8 differs from the shut-off structure 8 shown in FIGS. 1–3 in that the operating plate 9 is articulated to the support plate 18 by a hinge 21. Thus, the elastic force urging the shut-off portion 11 to its retracted position is not influenced by the stiffness and the curvature of the transition between the operating plate 9 and the support plate 18. This is particularly advantageous if the plates 9, 19 are made of plastic material and the bags are to be inflated at widely differing ambient temperatures.

The elastic force urging the shut-off portion 11 to its retracted position is particularly accurately controllable and independent of ambient temperatures, because the elastic members includes a metal spring 22.

The metal spring 22 is a cupped spring washer of a type which has a negative spring constant over a portion of its operating trajectory. This provides the advantage that the shut-off portion 11 is essentially maintained in its retracted position until the force exerted onto the operating plate 9 exceeds a predetermined level. Then the spring 22 quickly switches from its extended condition shown in FIG. 4 to its compressed condition shown in FIG. 5. Thus a quick easily distinguishable action of the shut-off structure is achieved and resistance by the shut-off portion 11 during inflation up to the predetermined level is minimised.

The shut-off portion 11 is located closely to the hinge 21 between the plates 9, 18. Thus, the plates 9, 18 also function as levers increasing the force exerted by the bladder 2 to a larger force exerted onto the shut-off portion 11. Furthermore, this position of the shut-off portion 11 provides the advantage that the pressure in the chamber 3 at which the shut-off structure 8 obstructs the passage 4 is less influenced by variations in the counterforces exerted by the filling pressure and the stiffness of the tube 5. The latter is typically relatively low if ambient temperature is relatively high.

Figure 7:
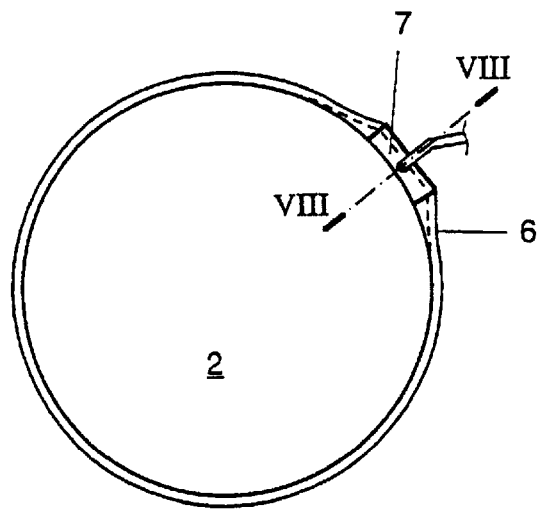
FIG. 7 is a schematic side view of a buoyancy bag according to the present invention.
Figure 8:
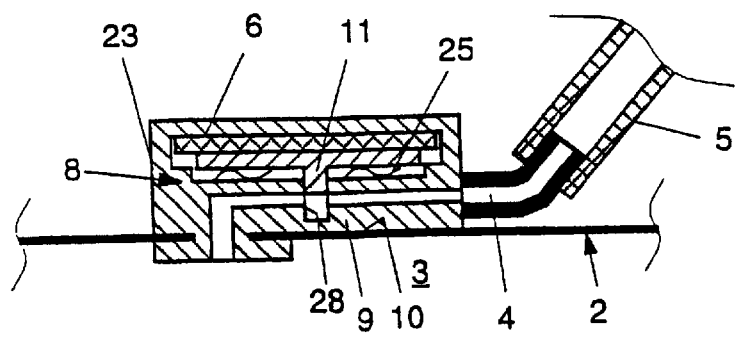
FIG. 8 is a cross-sectional view along the line VIII—VIII in FIG. 7.

In FIGS. 7 and 8 a different application of the invention to a buoyancy bag is shown. The cover is provided in the form of a belt 6 arranged around the bladder 2 which forms a buoyancy body. The operating member 9 is integrated in a housing 23 through which the passage extends and which also includes a passage through which the belt 6 extends. The shut-off portion 11 is provided in the form of a piston which is displaceable in a bore 28 traversed by the passage 4. A spring 25 in provided for urging the piston 11 into its retracted position.

During inflation of the bladder 2, the belt 6 is tensioned and urges the piston 11 towards its forward position in the bore 28 closing off the passage. The piston is moved into its forward position if the force exerted pressing the bladder 2 and the belt 6 together in the area of the shut-off structure 8 exceeds is sufficient to compress the spring 25.

What is claimed is:

1. An inflatable device comprising:

a collapsible, essentially airtight bladder bounding a chamber;

a filling passage communicating with said chamber for filling said chamber; and a shut-off structure for at least partially shutting off said passage;

said shut-off structure having an operating member and a shut-off portion; and said shut-off portion having a surface area displaceable by said operating member between a forward position at least partially shutting off said passage and a retracted position clearing said passage, said displacement from said retracted position to said forward position being responsive to inflation pressure in said bladder;

a cover covering at least a portion of said bladder, such that said cover is tensioned if said bladder is in an inflated condition;

an interspace between said cover and said bladder; and said shut-off structure being positioned in said interspace, said operating member extending along a first surface area of said bladder, at least if said bladder is in said inflated condition, said surface area of said shut-off portion forming a second surface area and being displaceable by said operating member from said retracted position to said forward position in response to compression of said shut-off structure between said first surface area of said bladder and said cover.

2. A device according to claim 1, wherein said first surface area is substantially larger than said second surface area.

3. A device according to claim 1, further including at least one elastic member arranged for urging said second surface area towards said retracted position.

4. A device according to claim 3, wherein said at least one elastic member includes a metal spring.

5. A device according to claim 3, wherein said elastic member has a negative spring constant over a portion of its operating trajectory.

6. A device according to claim 1, wherein said operating member is formed by an operating plate and said passage passes between said operating plate and a support plate opposite said operating plate.

* * * * *